US012732746B2

(12) United States Patent
Fukui et al.

(10) Patent No.: US 12,732,746 B2
(45) Date of Patent: Sep. 8, 2026

(54) SOUND SYSTEM

(71) Applicant: NTT, Inc., Tokyo (JP)

(72) Inventors: Masahiro Fukui, Tokyo (JP); Kazunori Kobayashi, Tokyo (JP); Noriyoshi Kamado, Tokyo (JP); Ryotaro Sato, Tokyo (JP)

(73) Assignee: NTT, Inc., Tokyo (JP)

( * ) Notice: Subject to any disclaimer, the term of this patent is extended or adjusted under 35 U.S.C. 154(b) by 180 days.

(21) Appl. No.: 18/277,930

(22) PCT Filed: Feb. 24, 2021

(86) PCT No.: PCT/JP2021/006870

§ 371 (c)(1),
(2) Date: Aug. 18, 2023

(87) PCT Pub. No.: WO2022/180685

PCT Pub. Date: Sep. 1, 2022

(65) Prior Publication Data

US 2024/0137694 A1 Apr. 25, 2024
US 2024/0236559 A9 Jul. 11, 2024

(51) Int. Cl.

*H04R 1/40* (2006.01)
*H04R 3/12* (2006.01)
*H04R 5/02* (2006.01)

(52) U.S. Cl.

CPC ............... *H04R 1/403* (2013.01); *H04R 3/12* (2013.01); *H04R 5/023* (2013.01); *H04R 2203/12* (2013.01); *H04R 2499/13* (2013.01)

(58) Field of Classification Search

CPC .......... H04R 1/403; H04R 3/12; H04R 5/023; H04R 2203/12; H04R 2499/13; G10K 11/175

See application file for complete search history.

(56) References Cited

U.S. PATENT DOCUMENTS 5,109,416 A * 4/1992 Croft ........................ H04R 5/02 381/1
8,325,938 B2 * 12/2012 Yokota .................. H04M 9/082 381/71.4

(Continued)

FOREIGN PATENT DOCUMENTS

| | | |
|---|---|---|
| JP | S6195189 U | 6/1986 |
| JP | H0833086 A | 2/1996 |
| JP | 2010045574 A | 2/2010 |

OTHER PUBLICATIONS

In-flight entertainment/Japan Airline first class, [online], [Searched on Feb. 1, 2021], Internet <URL: https://www.al.co.jp/jp/ja/inter/service/first/entertainment/index.html> with its English version.

(Continued)

*Primary Examiner* — Disler Paul

(57) ABSTRACT

Provided is an acoustic system for a user who uses a seat of an aircraft, an automobile, or the like, which reproduces a sound that cannot be heard by surrounding users without using earphones or headphones. An acoustic system including: a directivity control device including at least one directivity control unit that generates a first processed acoustic signal from a first acoustic signal and generates a second processed acoustic signal from a second acoustic signal having an opposite phase to the first acoustic signal by executing predetermined signal processing; and a speaker system including at least one speaker unit pair including a positive speaker unit that emits a sound based on the first processed acoustic signal and a negative speaker unit that emits a sound based on the second processed acoustic signal, in which the signal processing executed by the directivity control unit is processing of causing a sound emitted from the positive speaker unit of the speaker unit pair and a sound emitted from the negative speaker unit of the speaker unit pair to be audible in an area to be made audible near the (Continued)

speaker unit pair and to be inaudible in an area to be made inaudible.

8 Claims, 20 Drawing Sheets

(56) References Cited

U.S. PATENT DOCUMENTS

| | | | | |
|---|---|---|---|---|
| 8,457,324 | B2 * | 6/2013 | Tice | H04R 1/323 381/71.7 |
| 8,509,452 | B2 * | 8/2013 | Yokota | G10K 11/17857 381/71.4 |
| 8,891,782 | B2 * | 11/2014 | Kim | H04R 3/12 381/71.7 |
| 11,503,407 | B2 * | 11/2022 | Corynen | H04R 3/12 |
| 2010/0041443 | A1 * | 2/2010 | Yokota | H04M 9/082 455/569.2 |

OTHER PUBLICATIONS

Articles presented on "NTT R&D Forum 2020 Connect"; A-15, Nov. 16, 2020, Internet <URL: https://www.rd.ntt/forum/> 1. Explanatory panel: Media Processing Device Technology in the Remote World Era; Deliver only the sounds you want to hear_ with its English translation; 2. Figures; and 3. Online article: Media processing technology for personalized sound zone; Delivering only sounds you want to make known/heard_ with its English translation generated by computer.

* cited by examiner

SOUND SYSTEM

CROSS-REFERENCE TO RELATED APPLICATIONS

This application is a U.S. 371 Application of International Patent Application No. PCT/JP2021/006870, filed on 24 Feb. 2021, the disclosure of which is hereby incorporated herein by reference in its entirety.

TECHNICAL FIELD

The present invention relates to a sound reproduction technology that can be used in an audio system installed in a seat of an aircraft, an automobile, or the like.

BACKGROUND ART

Conventionally, a user uses earphones or headphones to view and listen to movies or music in an aircraft (see Non Patent Literature 1). This is because when a speaker is used, the reproduced sound reaches the periphery of the user, which causes trouble to other users.

CITATION LIST

Non Patent Literature

Non Patent Literature 1: In-flight entertainment/Japan Airline first class, [online], [Searched on Feb. 1, 2021], Internet <URL: https://www.jal.co.jp/jp/ja/inter/service/first/entertainment/index.html>

SUMMARY OF INVENTION

Technical Problem

However, wearing earphones or headphones is troublesome for the user. In addition, there are users who do not like wearing due to, for example, disheveling of hair. Some users do not like pressure on their ears due to wearing. Furthermore, wearing earphones or headphones for a long time may make the user feel tired of listening.

In order to eliminate the need to wear earphones or headphones, it is conceivable to synthesize a virtual sound field using a wavefront synthesis technology, but in this case, it is necessary to prepare a large-scale speaker array, which is not realistic.

Therefore, an object of the present invention is to provide an acoustic system for a user, by way of example, who uses a seat of an airplane or an automobile, which reproduces a sound that cannot be heard by surrounding users without using earphones or headphones.

Solution to Problem

An aspect of the present invention is an acoustic system including: a directivity control device including at least one directivity control unit that generates a first processed acoustic signal from an acoustic signal (hereinafter, referred to as a first acoustic signal) of a predetermined sound source and generates a second processed acoustic signal from an acoustic signal (hereinafter, referred to as a second acoustic signal) having an opposite phase to the first acoustic signal by executing predetermined signal processing; and a speaker system including at least one speaker unit pair including a speaker unit (hereinafter, referred to as a positive speaker unit) that emits a sound based on the first processed acoustic signal and a speaker unit (hereinafter, referred to as a negative speaker unit) that emits a sound based on the second processed acoustic signal, in which the signal processing executed by the directivity control unit is processing of causing a sound emitted from the positive speaker unit of the speaker unit pair and a sound emitted from the negative speaker unit of the speaker unit pair to be audible in an area to be made audible near the speaker unit pair and to be inaudible in an area to be made inaudible.

An aspect of the present invention is an acoustic system including: a reproduction device including an n-th reproduction unit (n=1, . . . , N) that outputs a (2n−1)-th acoustic signal that is an acoustic signal of a predetermined sound source and a 2n-th acoustic signal that is an acoustic signal having an opposite phase to the (2n−1)-th acoustic signal; a directivity control device including an n-th directivity control unit (n=1, . . . , N) that generates a (2n−1)-th processed acoustic signal from the (2n−1)-th acoustic signal and generates a 2n-th processed acoustic signal from the 2n-th acoustic signal by executing predetermined signal processing; and a speaker system including an n-th speaker unit pair (n=1, . . . , N) including a speaker unit (hereinafter, referred to as a positive speaker unit) that emits sound based on the (2n−1)-th processed acoustic signal and a speaker unit (hereinafter, referred to as a negative speaker unit) that emits sound based on the 2n-th processed acoustic signal, in which N is an integer of 1 or more, and the signal processing executed by the n-th directivity control unit (n=1, . . . , N) is processing of causing a sound emitted from the positive speaker unit of the n-th speaker unit pair and a sound emitted from the negative speaker unit of the n-th speaker unit pair to be audible in an area to be made audible near the n-th speaker unit pair and to be inaudible in an area to be made inaudible.

Advantageous Effects of Invention

According to the present invention, it is possible to reproduce a sound that can be heard only in a very limited narrow range.

DESCRIPTION OF EMBODIMENTS

Figure 1:
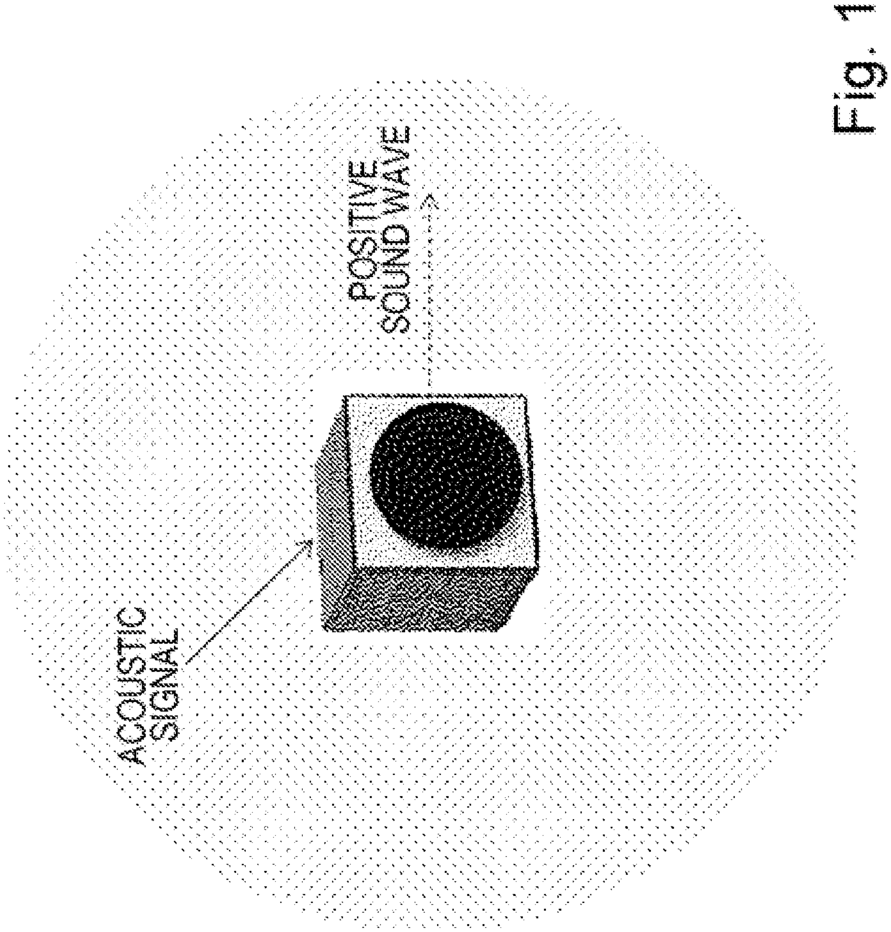
FIG. 1 is a diagram for explaining directivity of a sound emitted from a speaker.

Hereinafter, embodiments of the present invention will be described in detail. Note that components having the same functions are denoted by the same reference numerals, and redundant description will be omitted.

TECHNICAL BACKGROUND

First, the directivity of a sound emitted from a speaker will be described. Next, the directivity of a sound emitted from a speaker unit pair of the invention of the present application will be described. Finally, results of experiments for confirming the effects of the speaker unit pair of the invention of the present application will be described.

«1: Directivity of Sound Emitted from Speaker»

Typically, a speaker includes a speaker unit and a speaker box. The speaker unit is a component including a diaphragm that converts an acoustic signal, which is an electric signal, into vibration of air (that is, generates a sound wave). In addition, the speaker box is a component that houses the speaker unit.

When the acoustic signal is input to the speaker, the diaphragm of the speaker unit vibrates, and a sound wave is radiated in both directions in which the diaphragm vibrates. Here, a sound wave radiated to the outside of the speaker box (that is, the front direction of the speaker unit) is referred to as a positive sound wave, and a sound wave radiated to the inside of the speaker box (that is, the rear direction of the speaker unit) is referred to as a negative sound wave. The negative sound wave is a sound wave having a phase opposite to the phase of the positive sound wave. FIG. 1 is a diagram for explaining directivity of sound emitted from a speaker. As illustrated in FIG. 1, the positive sound wave is radiated from the speaker in all directions, while the negative sound wave does not exit the speaker box. As a result, the sound emitted from the speaker can be heard in a wide range.

«2: Directivity of Sound Emitted from Speaker Unit Pair»

Figure 2:
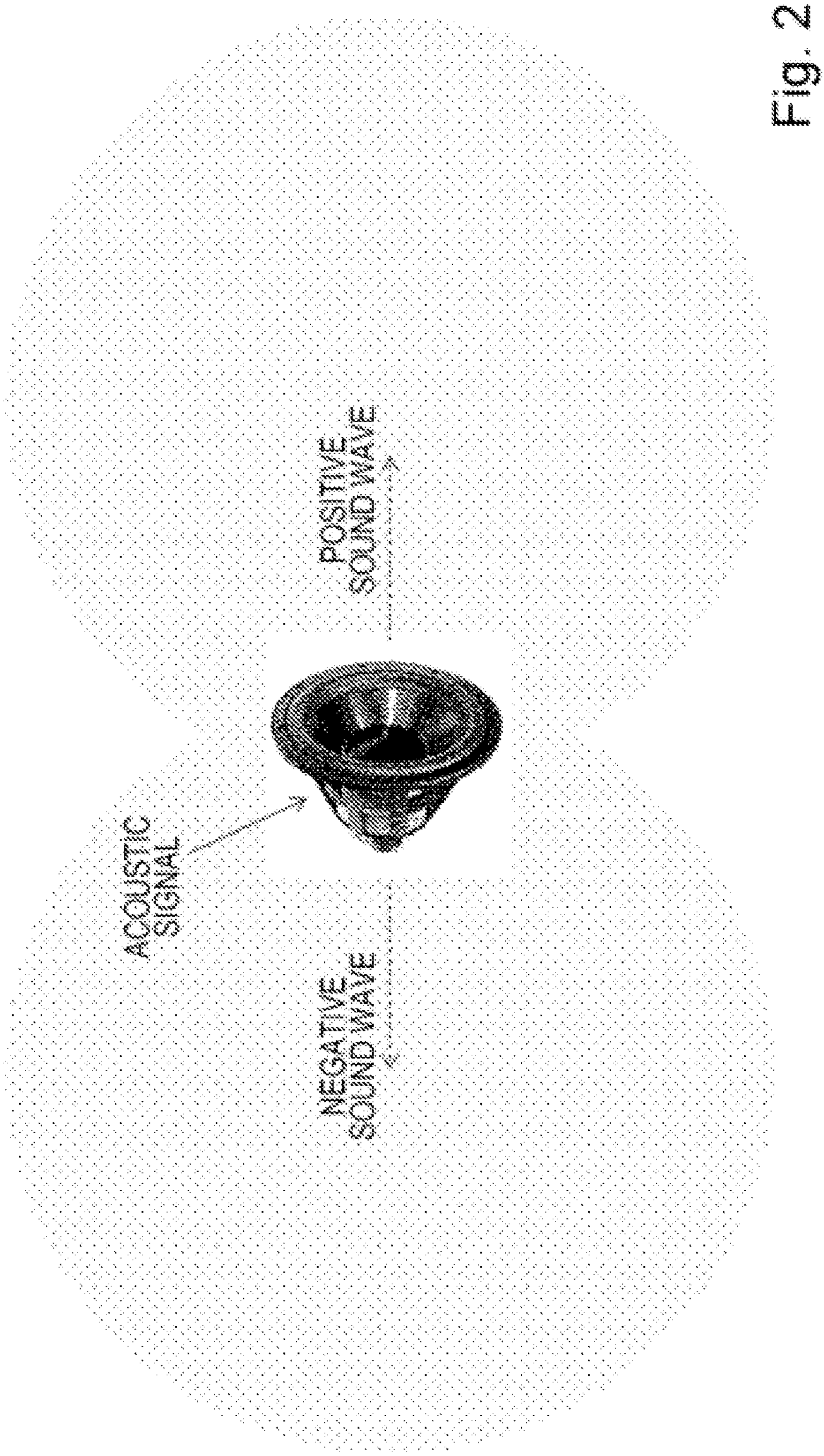
FIG. 2 is a diagram for explaining directivity of a sound emitted from a speaker unit.

Here, first, the directivity of a sound emitted from the speaker unit, which is a bare speaker, will be described. FIG. 2 is a diagram for explaining directivity of a sound emitted from a speaker unit. In the case of only the speaker unit, a negative sound wave is radiated from the back surface of the speaker unit hidden in the speaker box, unlike the case of the speaker. Therefore, as illustrated in FIG. 2, the sound emitted from the speaker unit has a characteristic of bidirectivity.

Figure 3:
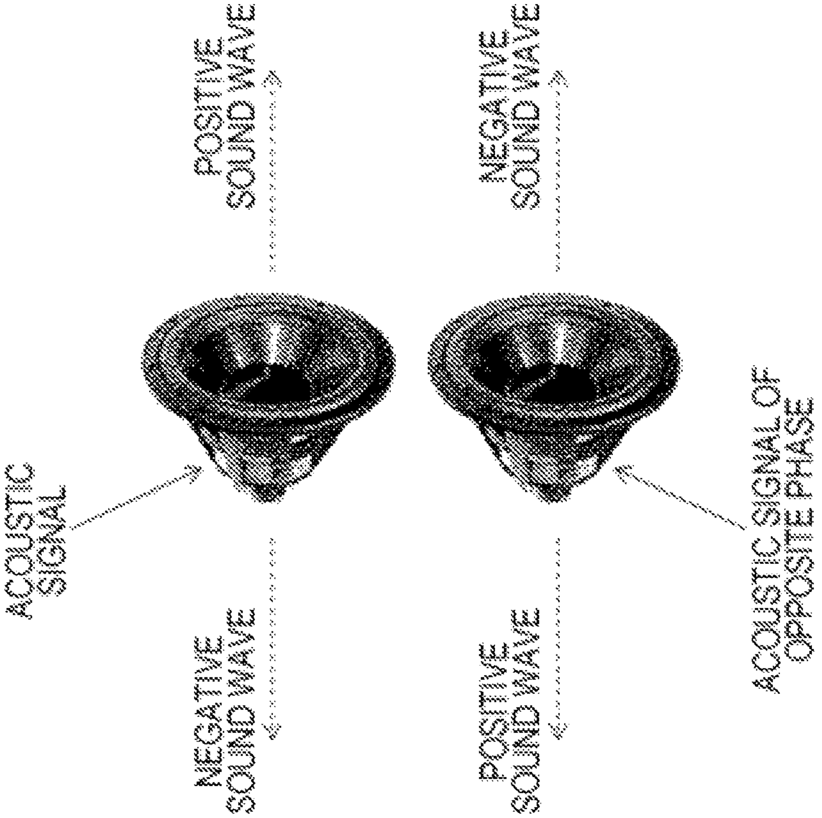
FIG. 3 is a diagram for explaining a sound emitted from a speaker unit pair.
Figure 4:
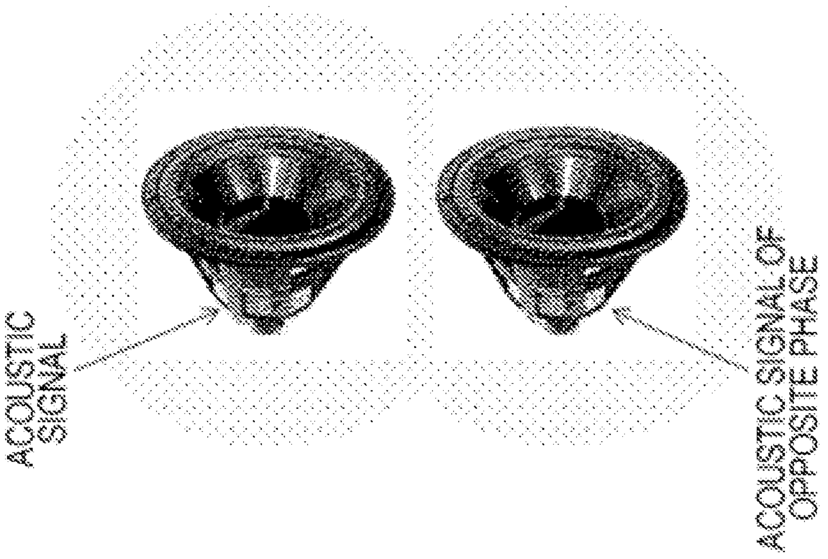
FIG. 4 is a diagram for explaining directivity of a sound emitted from a speaker unit pair.

In the invention of the present application, this bidirectivity is used. Hereinafter, a specific description will be given. First, as illustrated in FIG. 3, two speaker units are arranged to form a speaker unit pair. When two acoustic signals having an opposite positive and negative relationship are input to the speaker unit pair, the diaphragms of the two speaker units vibrate, and sounds based on the two acoustic signals are emitted. Then, as illustrated in FIG. 4, a sound in all directions except for the vicinity of the speaker unit pair is erased. In other words, the sound is erased only at a position sufficiently away from the speaker unit pair, and the sound is not erased in the vicinity of the speaker unit pair. The reason why the sound is not erased in the vicinity of the speaker unit pair is that the phases of the sound wave radiated from the front surface of the speaker unit and the sound wave going around from the back surface do not match in the vicinity of the speaker unit pair.

That is, by utilizing the property that a sound can be heard only in the vicinity of the speaker unit pair when a predetermined acoustic signal is input to one speaker unit constituting the speaker unit pair and an acoustic signal having a phase opposite to that of the predetermined acoustic signal is input to the other speaker unit, it is possible to create a situation in which only the user in the vicinity of the speaker unit pair can hear the sound and the other users can not hear the sound.

«3: Experimental Results»

Figure 5:
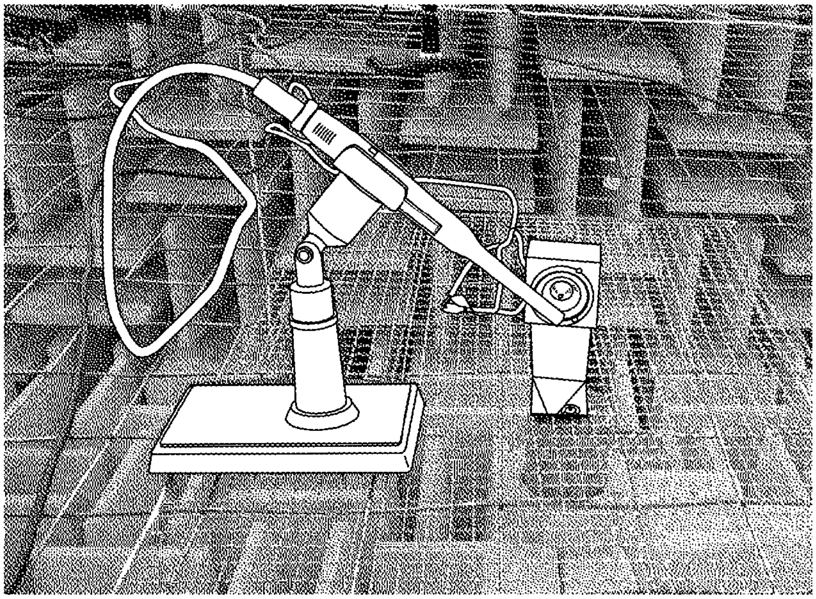
FIG. 5 is a diagram illustrating a state of an experiment (positional relationship between a speaker and a microphone).
Figure 6:
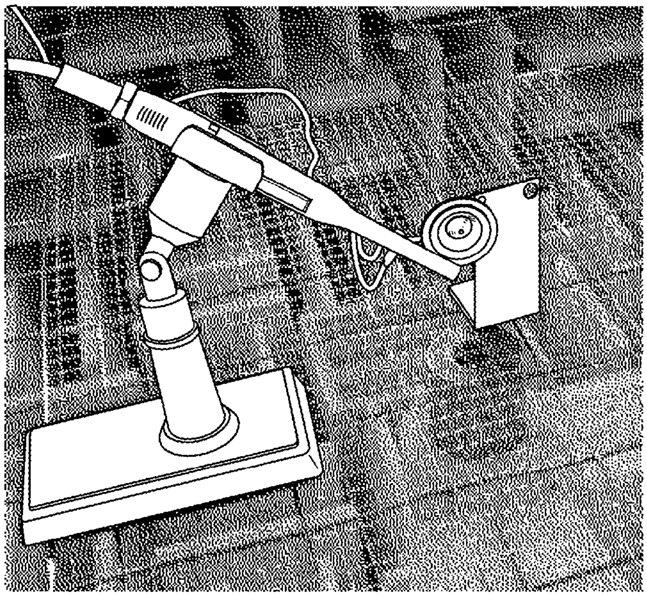
FIG. 6 is a diagram illustrating a state of an experiment (positional relationship between a speaker unit and a microphone).
Figure 7:
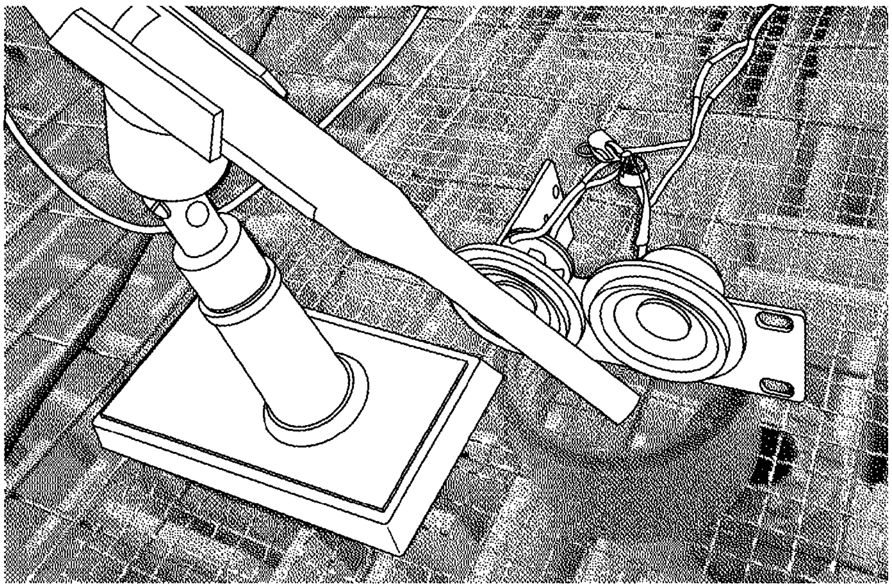
FIG. 7 is a diagram illustrating a state of an experiment (positional relationship between a speaker unit pair and a microphone).

Here, results of experiments for measuring frequency characteristics of a speaker, a speaker unit, and a speaker unit pair will be described. In the experiments, as a speaker, a speaker unit, and a speaker unit pair, a speaker having a diaphragm with a diameter of 4.5 cm (see FIG. 5), a speaker unit obtained by removing the speaker box from the speaker (see FIG. 6), and a speaker unit pair having the two speaker units arranged side by side (see FIG. 7) were used. In addition, in order to measure frequency characteristics in the vicinity of the speaker, the speaker unit, and the speaker unit pair, microphones were installed under four conditions described below.

Figure 8:
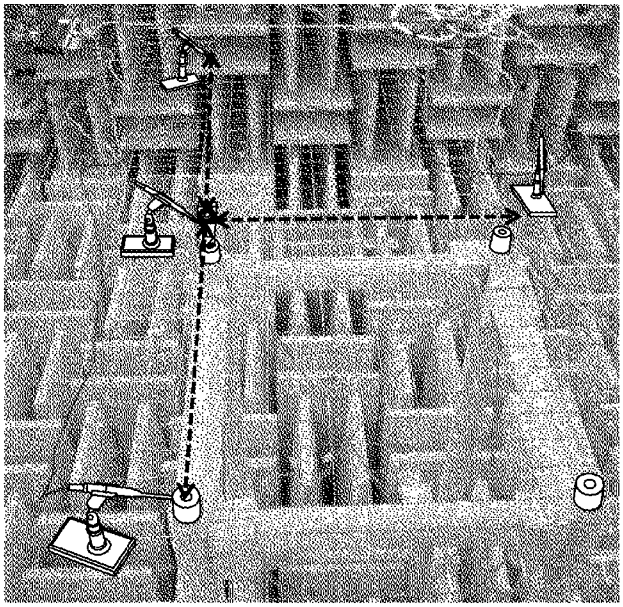
FIG. 8 is a diagram illustrating a state of an experiment (other measurement positions).
Figure 9:
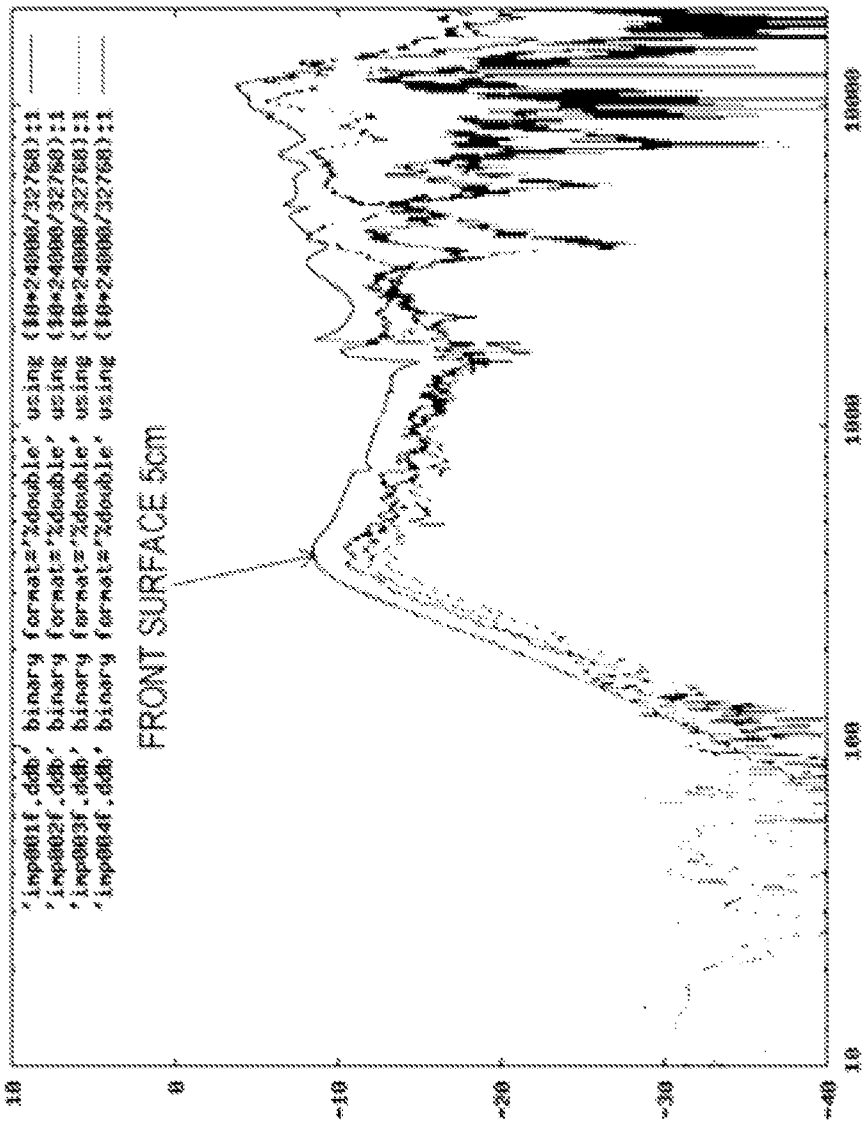
FIG. 9 is a diagram illustrating an experimental result (Condition 1).
Figure 10:
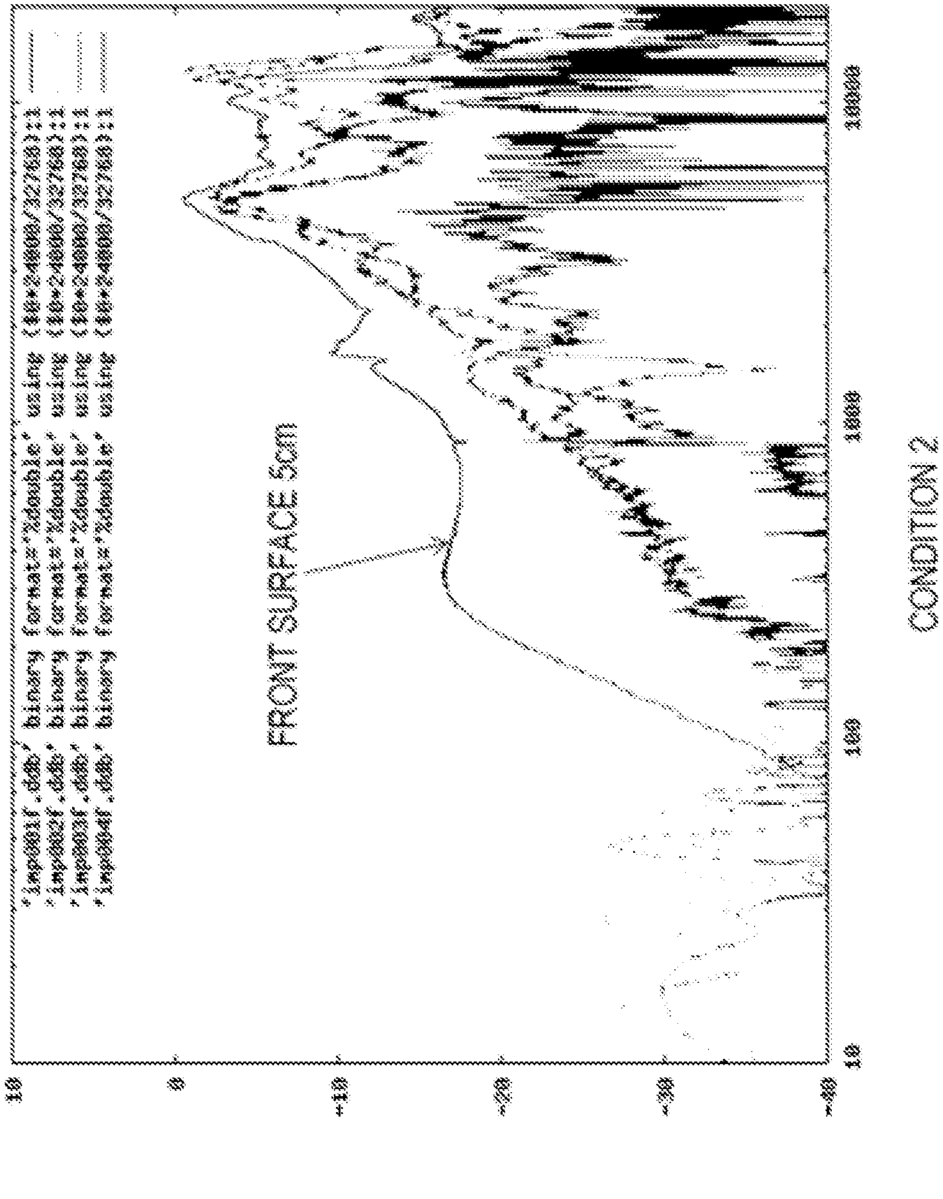
FIG. 10 is a diagram illustrating an experimental result (Condition 2).
Figure 11:
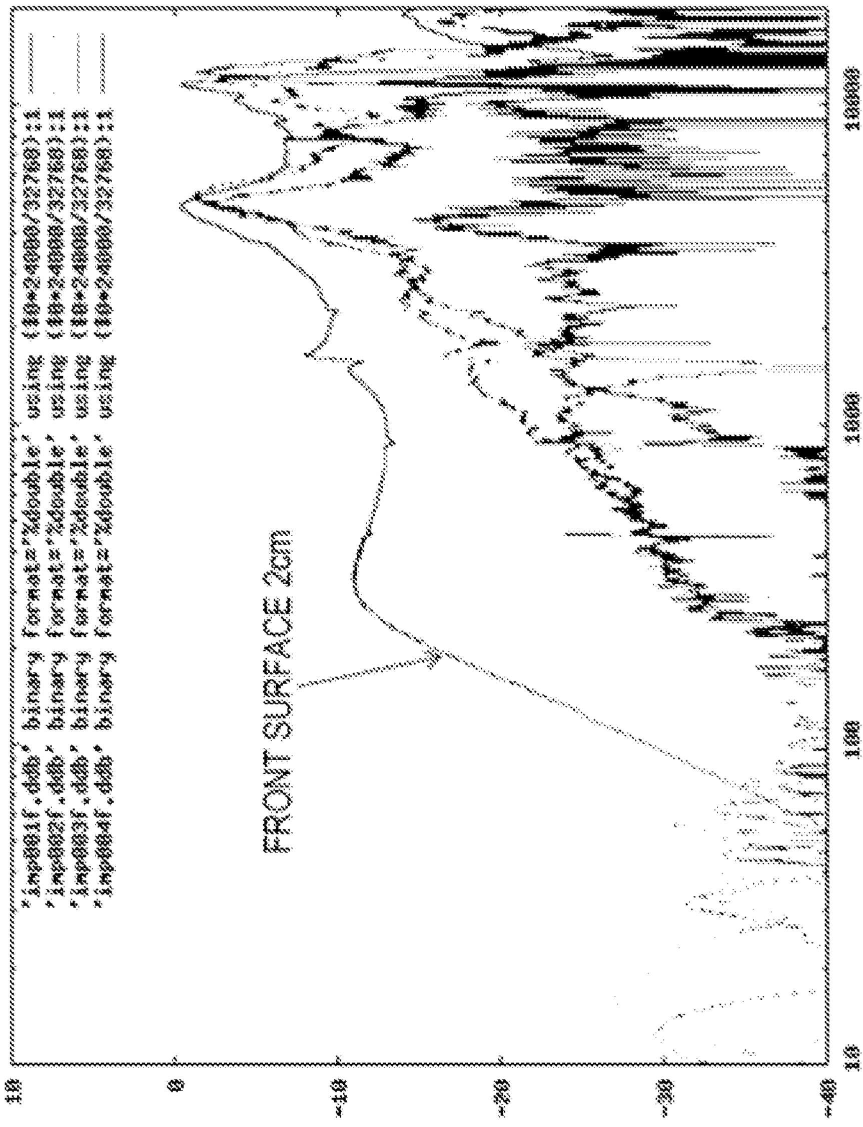
FIG. 11 is a diagram illustrating an experimental result (Condition 3).
Figure 12:
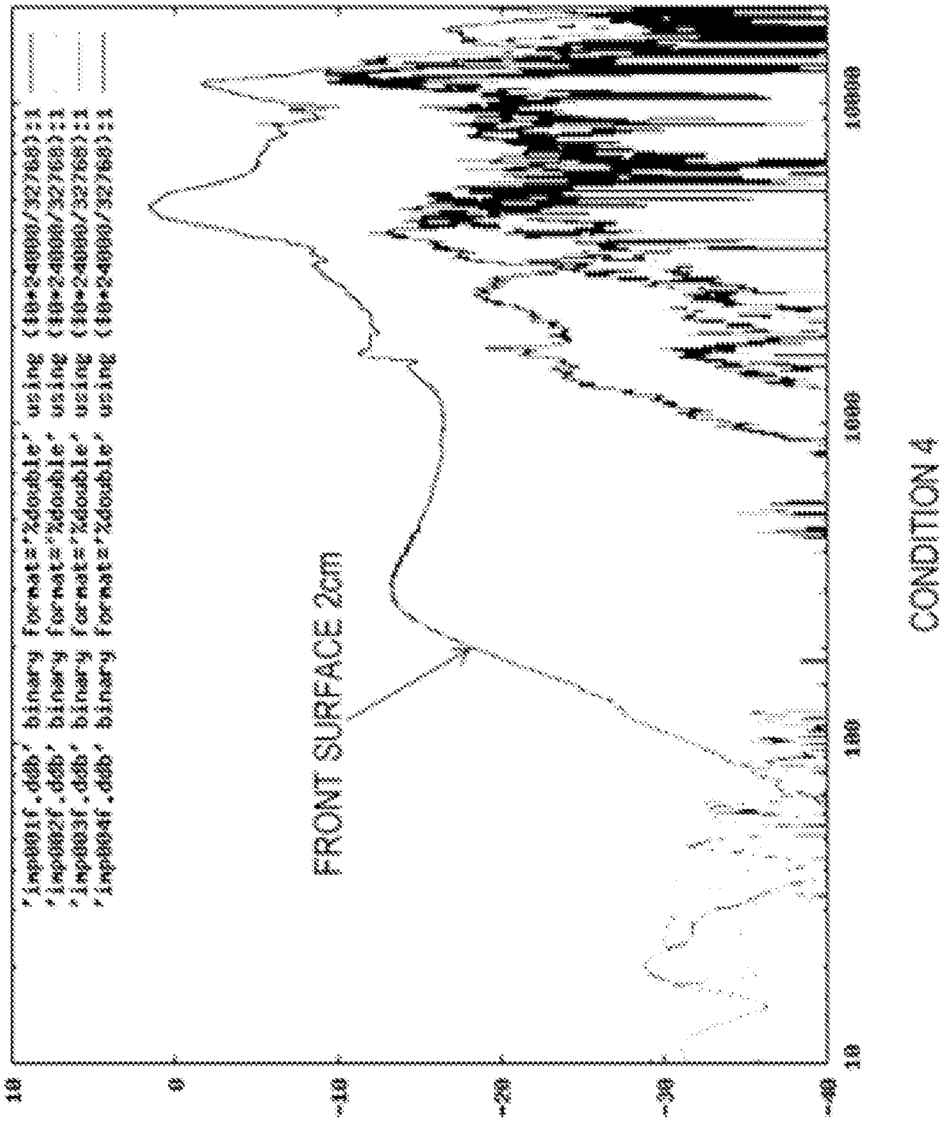
FIG. 12 is a diagram illustrating an experimental result (Condition 4).

(Condition 1) Position of 5 cm from the front surface of the speaker (Condition 2) Position of 5 cm from the front surface of the speaker unit (Condition 3) Position of 2 cm from the front surface of the speaker unit (Condition 4) Position of 2 cm from the front surface of the speaker unit pair In addition, for any of the conditions, microphones were also installed at positions of 100 cm from the front surface, back surface, and side surface of the speaker, the speaker unit, and the speaker unit pair for comparison (see FIG. 8).

Hereinafter, experimental results will be described. FIGS. 9, 10, 11, and 12 are diagrams illustrating experimental results, and are diagrams illustrating relationships between frequencies and attenuation under Conditions 1, 2, 3, and 4. In each drawing, four curves are illustrated, one curve indicated by an arrow is obtained by collecting a sound with the microphone at the position of 5 cm or 2 cm from the front surface, and the other three curves are obtained by collecting sounds with the microphones at the positions of 100 cm from the front surface, the back surface, and the side surface. Note that the position of 5 cm or 2 cm from the front surface is located in the vicinity of the speaker or the like and thus the curve at the position of 5 cm or 2 cm from the front surface has a very large gain. Therefore, the curve at the position of 5 cm from the front surface is plotted with its value reduced by 25 dB from the three curves at the positions of 100 cm for the sake of easy viewing. Similarly, the curve at the position of 2 cm from the front surface is plotted with its value reduced by 32 dB. Comparing FIG. 9 with FIG. 10, it can be seen that there is almost no difference among the four curves when the speaker is used, whereas there is a difference between the curve at the position of 5 cm from the front surface and the other three curves when the speaker unit is used. This difference is more remarkable in a lower frequency range. In addition, comparing FIG. 11 with FIG. 12, it can be seen that the speaker unit pair has a larger difference between the curve at the position of 2 cm from the front surface and the other three curves than the speaker unit.

As described above, it was confirmed from the experiments that the sound emitted from the speaker unit pair of the invention of the present application can be heard only in the vicinity of the speaker unit pair.

First Embodiment

A system that reproduces an acoustic signal obtained on the basis of a reproduction target is referred to as an acoustic system. The acoustic system includes a speaker system for emitting an acoustic signal as a sound (hereinafter, this sound is referred to as a sound based on the acoustic signal). Here, the speaker system is a device that converts an acoustic signal that is an analog signal into a sound. In addition, the reproduction target is, for example, data or a signal based on which it is possible to obtain an acoustic signal by predetermined processing, such as data recorded in a CD, a DVD, or a record, data received through the Internet, or a signal received through radio broadcasting or television broadcasting.

Figure 13:
FIG. 13 is a diagram illustrating an example of an acoustic system installed in a seat of an aircraft.

Here, the acoustic system that reproduces an acoustic signal obtained from a reproduction target so that only a user in the vicinity of the speaker system can hear a sound based on the acoustic signal will be described. That is, the reproduced sound of the acoustic system cannot be heard by users other than the user in the vicinity of the speaker system. When such an acoustic system is used, for example, as an acoustic system for a user who uses a seat of an aircraft, it is possible to provide a system in which only the user who uses the seat can hear the reproduced sound. FIG. 13 is a diagram illustrating an example of an acoustic system installed in a seat of an aircraft. The acoustic system in FIG. 13 is installed at the seat so as to sandwich the head of the seated user, and two speaker unit pairs are arranged to be near the left and right ears. Note that such an acoustic system can also be installed in vehicles other than aircrafts such as automobiles and trains, a reclining chair, and the like, and can also be installed in a wearable form such as being placed on a shoulder. In addition, a driver unit pair in which two driver units corresponding to the above-described speaker unit pair are arranged may be installed in each of left and right units of headphones or earphones. The headphones are generally roughly classified into an open-type (open-air type) and a closed-back type (closed-type), and when the above technique is applied particularly to an open-type in which there is a concern of sound leakage, sound leakage is expected to be reduced.

Figure 14:
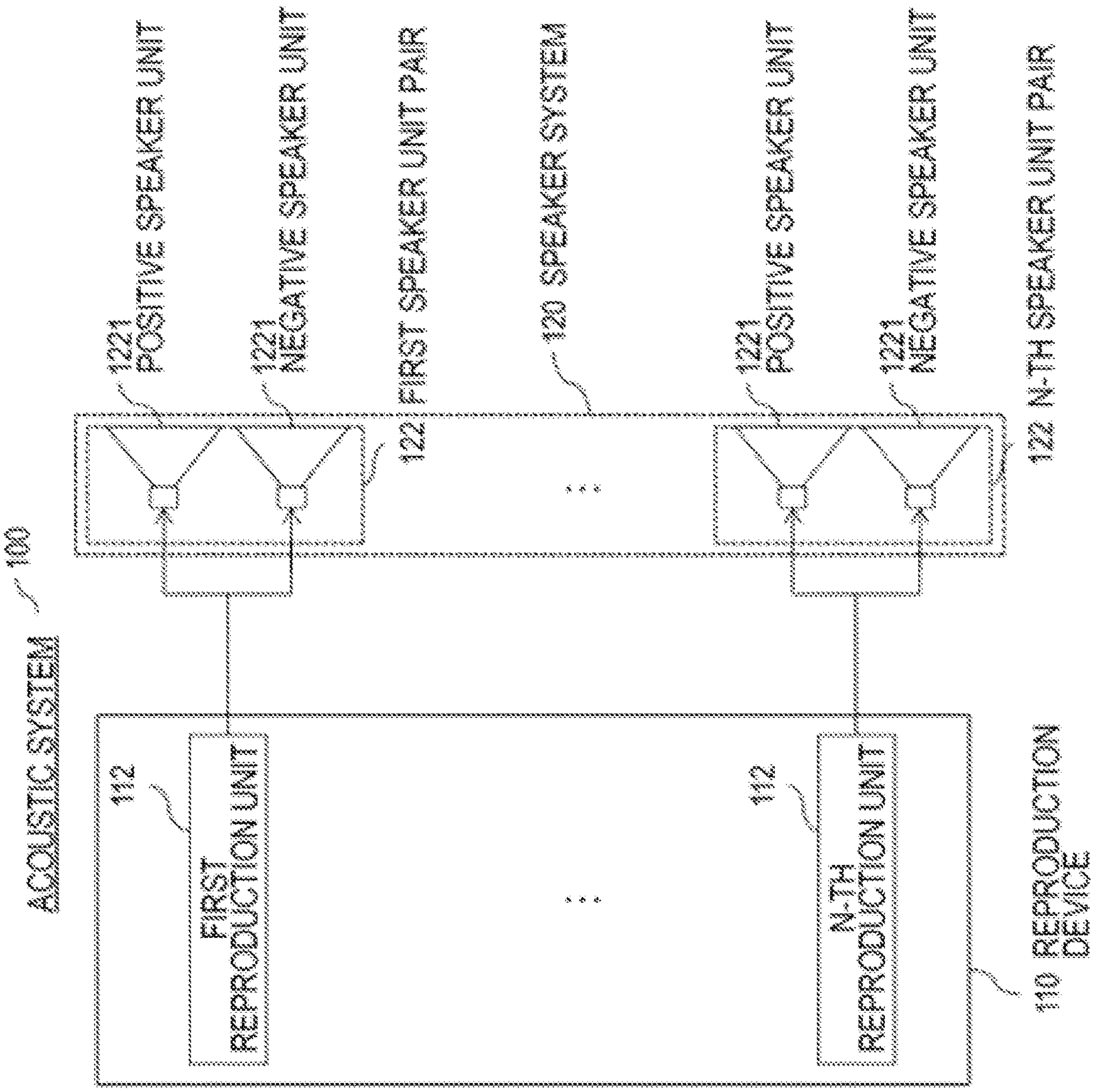
FIG. 14 is a block diagram illustrating an example of a configuration of an acoustic system 100.

Hereinafter, an acoustic system 100 will be described with reference to FIG. 14. FIG. 14 is a block diagram illustrating a configuration of the acoustic system 100. As illustrated in FIG. 14, the acoustic system 100 includes a reproduction device 110 and a speaker system 120. The reproduction device 110 includes N (where N is an integer of 1 or more) reproduction units 112 (that is, a first reproduction unit 112, . . . , and an N-th reproduction unit 112). In addition, the speaker system 120 also includes N speaker unit pairs 122 (that is, a first speaker unit pair 122, . . . , and an N-th speaker unit pair 122). Each speaker unit pair 122 includes two speaker units (that is, a positive speaker unit 1221 and a negative speaker unit 1221). An acoustic signal having a phase opposite to that of an acoustic signal input to the positive speaker unit 1221 is input to the negative speaker unit 1221. The speaker system 120 is installed at a position close to the head of the user who uses the seat.

Note that a direction in which the n-th speaker unit pair 122 faces the user is defined as an n-th user direction (n=1, . . . , N), and the positive speaker unit 1221 and the negative speaker unit 1221 of the n-th speaker unit pair 122 (n=1, . . . , N) are arranged so that a sound emitted from the positive speaker unit 1221 in a direction opposite to the n-th user direction and a sound emitted from the negative speaker unit 1221 in the direction opposite to the n-th user direction are transmitted in the n-th user direction by wraparound. Here, the n-th user direction is a front direction of the positive speaker unit 1221 and the negative speaker unit 1221 of the n-th speaker unit pair 122. In addition, the direction opposite to the n-th user direction is a rear direction of the positive speaker unit 1221 and the negative speaker unit 1221 of the n-th speaker unit pair 122.

In addition, the positive speaker unit 1221 and the negative speaker unit 1221 of the n-th speaker unit pair 122 (n=1, . . . , N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, an operation of the acoustic system 100 will be described with reference to FIG. 14.

The reproduction device 110 receives, as input, a first acoustic signal, a third acoustic signal, . . . , and a (2N−1)-th acoustic signal, which are acoustic signals obtained on the basis of the reproduction target, and outputs the first acoustic signal, a second acoustic signal, . . . , and a 2N-th acoustic signal. More specifically, an n-th reproduction unit 112 (n=1, . . . , N) receives, as input, a (2n−1)-th acoustic signal, generates a 2n-th acoustic signal that is an acoustic signal having a phase opposite to that of the (2n−1)-th acoustic signal from the (2n−1)-th acoustic signal, and outputs the (2n−1)-th acoustic signal and the 2n-th acoustic signal. The (2n−1)-th acoustic signal and the 2n-th acoustic signal are input to the positive speaker unit 1221 and the negative speaker unit 1221 of the n-th speaker unit pair 122, respectively.

The speaker system 120 receives, as input, the first acoustic signal, the second acoustic signal, . . . , and the 2N-th acoustic signal output from the reproduction device 110, and emits a sound based on the first acoustic signal, a sound based on the second acoustic signal, . . . , and a sound based on the 2N-th acoustic signal. More specifically, the n-th speaker unit pair 122 (n=1, . . . , N) receives, as input, the (2n−1)-th acoustic signal and the 2n-th acoustic signal, emits a sound based on the (2n−1)-th acoustic signal from the positive speaker unit 1221, and emits a sound based on the 2n-th acoustic signal from the negative speaker unit 1221. Since the (2n−1)-th acoustic signal and the 2n-th acoustic signal are in opposite phase relationship with each other, the sound is heard only in the vicinity of the seat where the speaker system 120 is installed as described in <Technical Background>. For example, in the case of N=2, when the first acoustic signal and the third acoustic signal are respectively a right-channel acoustic signal and a left-channel acoustic signal of a certain sound source, a stereo sound can be heard only in the vicinity of the seat where the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the direction opposite to the n-th user direction have a mutually opposite phase relationship. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in mutually opposite phase relationship.

According to the embodiment of the present invention, it is possible to reproduce a sound that can be heard only in a very limited narrow range such as the vicinity of the speaker system.

Second Embodiment

Figure 15:
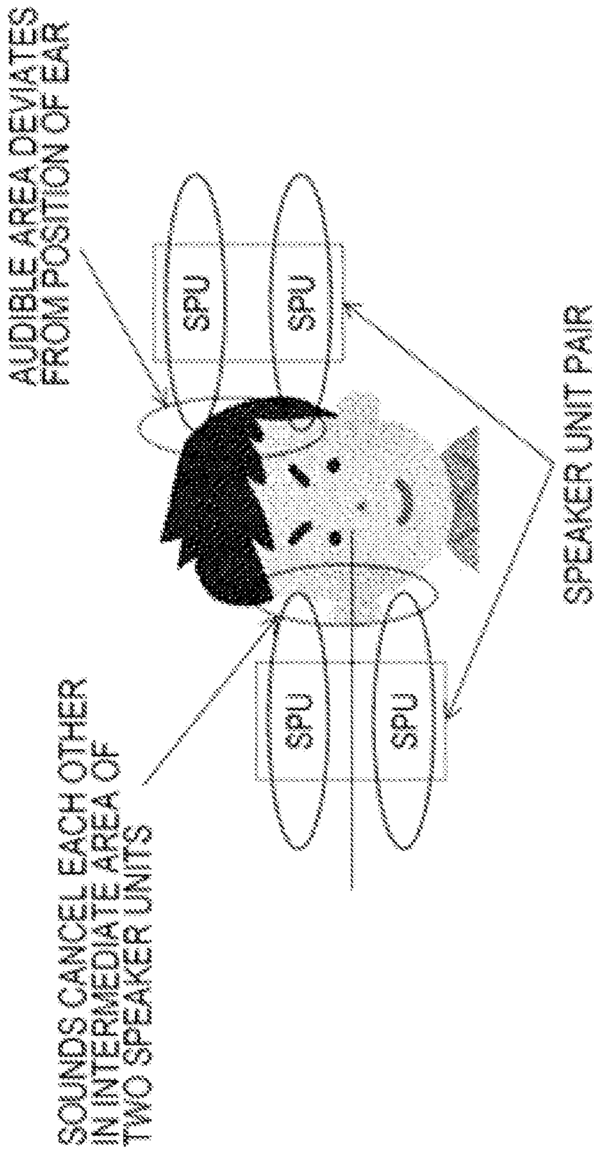
FIG. 15 is a diagram illustrating a state of sound emitted from a speaker unit pair.

FIG. 15 is a diagram illustrating a state of a sound emitted from a speaker unit pair. The SPU in the drawing represents a speaker unit. In the case of a speaker unit pair installed near the right ear, the sounds from the respective speaker units cancel each other in an intermediate area of the two speaker units, so that an area where the user cannot hear the sound emitted from the speaker unit pair occurs and the user cannot hear the sound. On the other hand, in the case of the speaker unit pair installed near the left ear, an area where the user can hear the sound emitted from the speaker unit pair deviates from the position of the ear, so that the user cannot hear the sound. In order to solve such a problem, the directivity of the sound emitted from the speaker unit pair is controlled. Here, an acoustic system that performs directivity control processing will be described.

Figure 16:
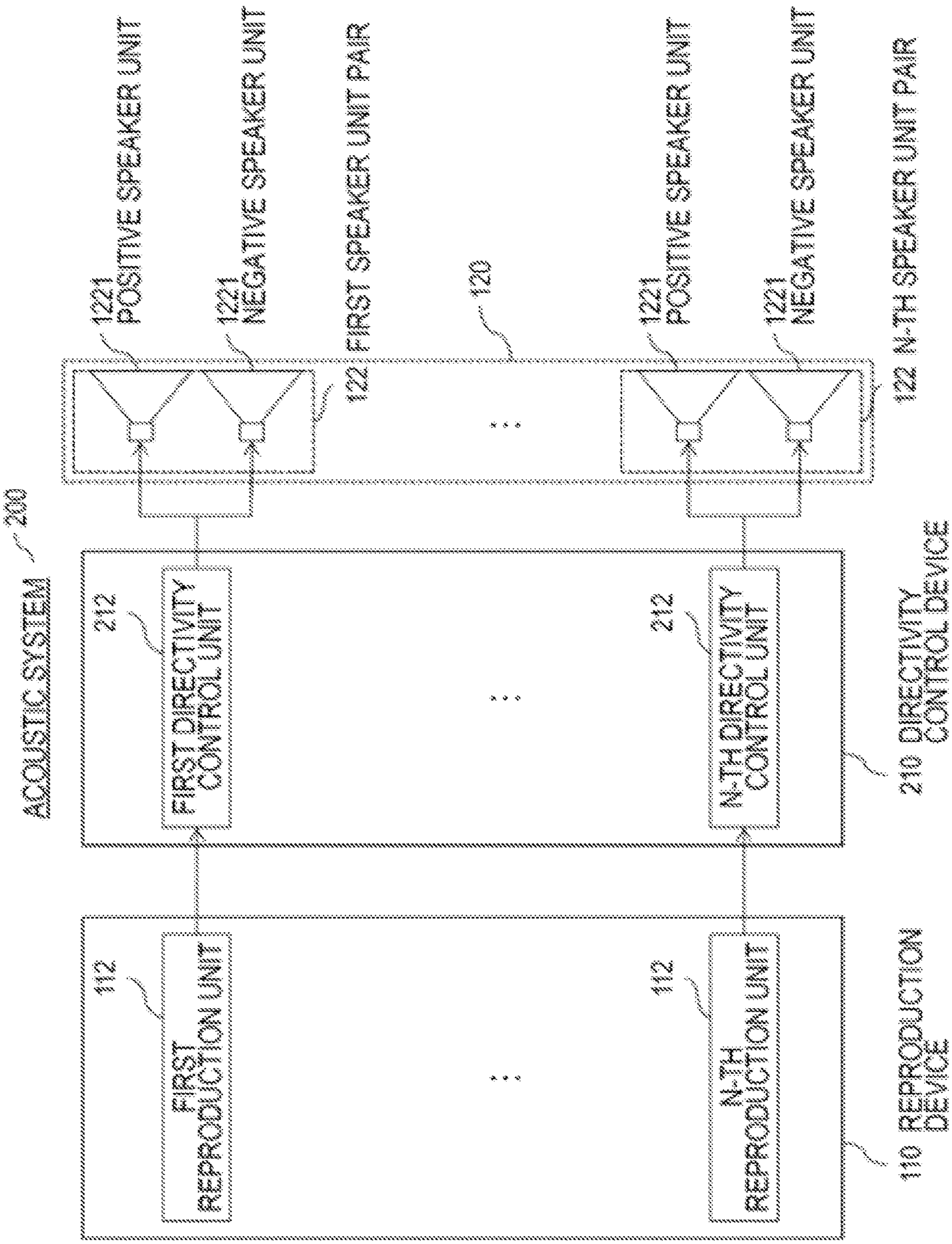
FIG. 16 is a block diagram illustrating an example of a configuration of an acoustic system 200.

Hereinafter, an acoustic system 200 will be described with reference to FIG. 16. FIG. 16 is a block diagram illustrating a configuration of the acoustic system 200. As illustrated in FIG. 16, the acoustic system 200 includes a reproduction device 110, a directivity control device 210, and a speaker system 120. The directivity control device 210 includes N directivity control units 212 (that is, a first directivity control unit 212, . . . , and an N-th directivity control unit 212). The acoustic system 200 differs from the acoustic system 100 in that it includes the directivity control device 210.

Hereinafter, operations of the directivity control device 210 and the speaker system 120 will be described with reference to FIG. 16.

The directivity control device 210 receives, as inputs, a first acoustic signal, a second acoustic signal, . . . , and a 2N-th acoustic signal output from the reproduction device 110, and outputs a first processed acoustic signal which is a signal obtained by performing signal processing on the first acoustic signal, a second processed acoustic signal which is a signal obtained by performing signal processing on the second acoustic signal, . . . , and a 2N-th processed acoustic signal which is a signal obtained by performing signal processing on the 2N-th acoustic signal. More specifically, the n-th directivity control unit 212 (n=1, . . . , N) receives, as inputs, the (2n−1)-th acoustic signal and the 2n-th acoustic signal, and executes predetermined signal processing to generate a (2n−1)-th processed acoustic signal from the (2n−1)-th acoustic signal, generate a 2n-th processed acoustic signal from the 2n-th acoustic signal, and output the (2n−1)-th processed acoustic signal and the 2n-th processed acoustic signal. Here, the predetermined signal processing is, for example, filtering using a finite impulse response (FIR) filter. The FIR filter used here is designed such that microphones are installed in an area to be made audible and an area to be made inaudible, respectively, so that the value of the filter coefficient approaches 1 in the microphones installed in the area to be made audible, and the value of the filter coefficient approaches 0 in the microphones installed in the area to be made inaudible. Hereinafter, a specific description will be given. The areas to be made audible and the areas to be made inaudible need to be designed according to the case. For example, a case of installing the microphone in a seat (hereinafter, referred to as seat S) of an automobile is considered. The position to which the ear comes when the user who uses the seat S moves the head or changes the direction of the face is included in the area to be made audible, and the position to which the ear comes when the user who uses the seat close to the seat S (for example, adjacent seat or front or rear seat) moves the head or changes the direction of the face is included in the area to be made inaudible. Therefore, for example, in a microphone installed in a rectangular parallelepiped area including a seat close to the seat S but not including the seat S, the value of the filter coefficient is made close to 0. Note that the value of the filter coefficient is set to approach 1 in the microphone installed in the intermediate area between the two speaker units in consideration of a case where a sound is not heard even at a position where the ear comes when the head is moved or the face direction is changed due to cancellation of sound in the intermediate area, as described above.

As a result, the n-th directivity control unit (n=1, . . . , N) executes signal processing of causing a sound emitted from the positive speaker unit of the n-th speaker unit pair and a sound emitted from the negative speaker unit of the n-th speaker unit pair to be audible in an area to be made audible near the n-th speaker unit pair and to be inaudible in an area to be made inaudible. Note that, the area to be made audible includes a point that is equidistant from the positive speaker unit of the n-th speaker unit pair and the negative speaker unit of the n-th speaker unit pair such that a sound emitted from the positive speaker unit of the n-th speaker unit pair and a sound emitted from the negative speaker unit of the n-th speaker unit pair cancel each other.

The speaker system 120 receives, as inputs, the first processed acoustic signal, the second processed acoustic signal, . . . , and the 2N-th processed acoustic signal output from the directivity control device 210, and emits a sound based on the first processed acoustic signal, a sound based on the second processed acoustic signal, . . . , and a sound based on the 2N-th processed acoustic signal. More specifically, the n-th speaker unit pair 122 (n=1, . . . , N) receives, as inputs, the (2n−1)-th processed acoustic signal and the 2n-th processed acoustic signal, emits a sound based on the (2n−1)-th processed acoustic signal from the positive speaker unit 1221, and emits a sound based on the 2n-th processed acoustic signal from the negative speaker unit 1221.

Modifications

Here, an acoustic system in which a high-frequency sound is less likely to leak by using a member having sound absorption characteristics will be described.

Figure 17:
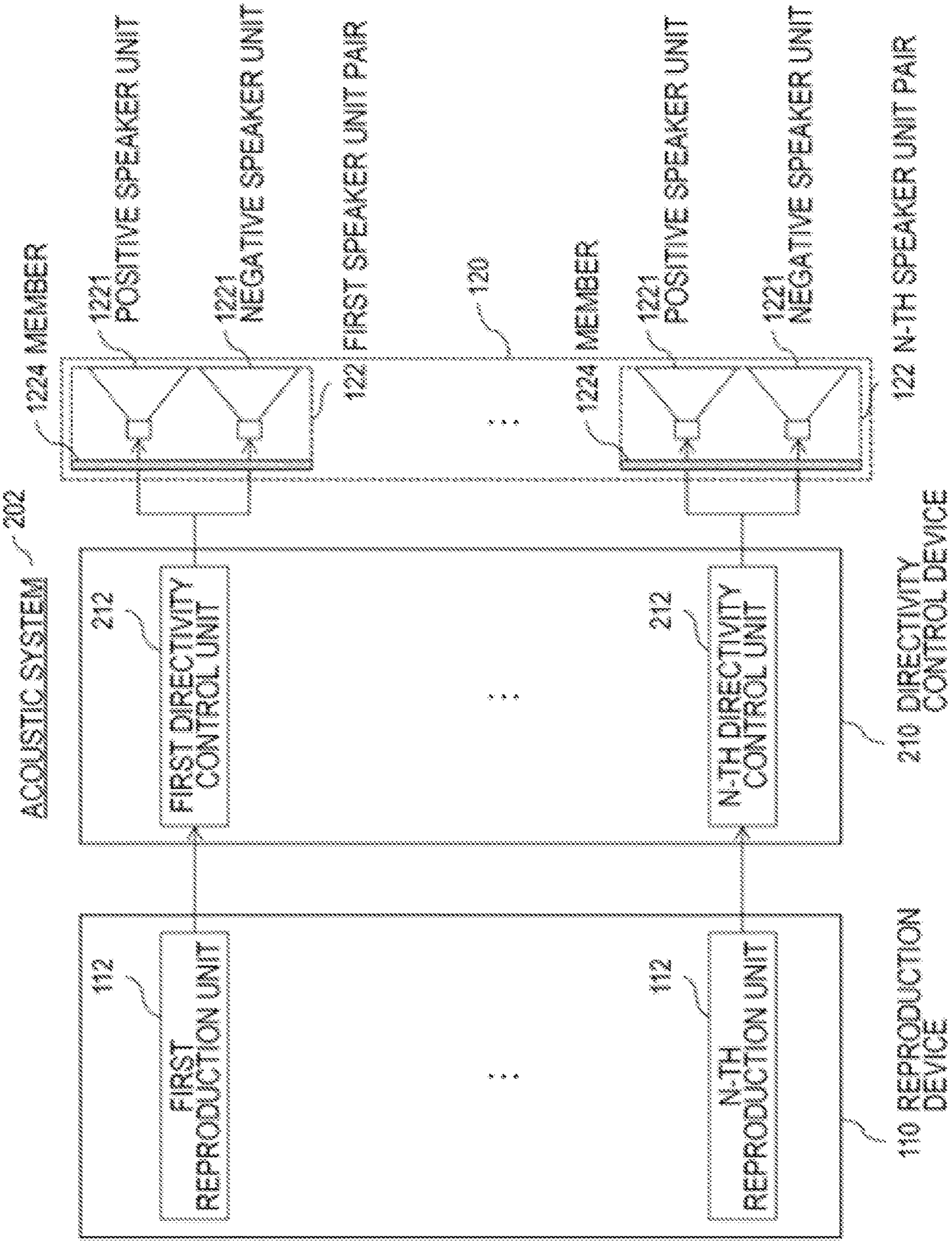
FIG. 17 is a block diagram illustrating an example of a configuration of an acoustic system 202.

Hereinafter, an acoustic system 202 will be described with reference to FIG. 17. FIG. 17 is a block diagram illustrating a configuration of the acoustic system 202. As illustrated in FIG. 17, similarly to the acoustic system 200, the acoustic system 202 includes a reproduction device 110, a directivity control device 210, and a speaker system 120. However, the acoustic system 202 differs from the acoustic system 200 in that a member 1224 is attached to the speaker unit pair 122.

Hereinafter, a structure of the n-th speaker unit pair 122 (n=1, . . . , N) will be described with reference to FIG. 17.

Figure 18:
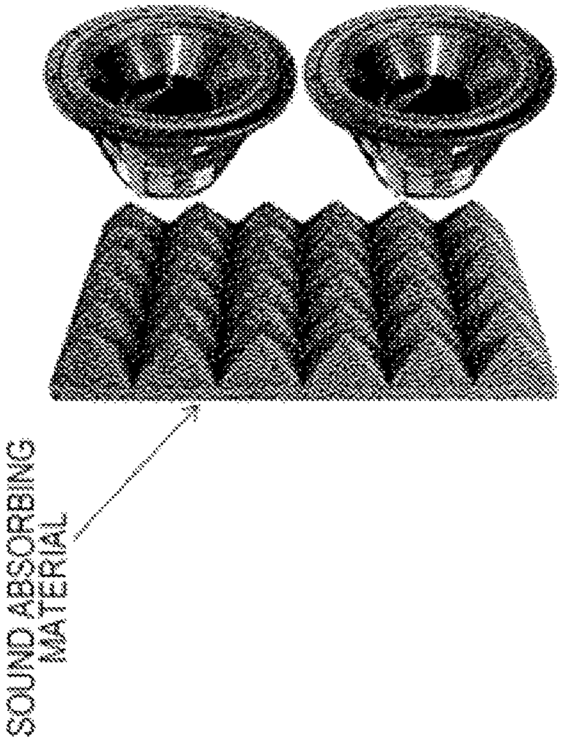
FIG. 18 is a diagram illustrating an example of a configuration of a speaker unit pair 122 to which a member 1224 is attached.

To the n-th speaker unit pair 122, the member 1224 is attached for absorbing a sound emitted in the direction opposite to the n-th user direction from the positive speaker unit 1221 and the negative speaker unit 1221 of the n-th speaker unit pair 122 (see FIG. 18). The member 1224 may be any member as long as a high-frequency sound can be prevented from being emitted from the back. Note that, instead of installing the member 1224 only on the back of the speaker unit pair 122, the member 1224 may be installed to surround other than the front surface of the speaker unit pair 122.

(Example of Acoustic System Installed in Seat of Automobile)

Figure 19:
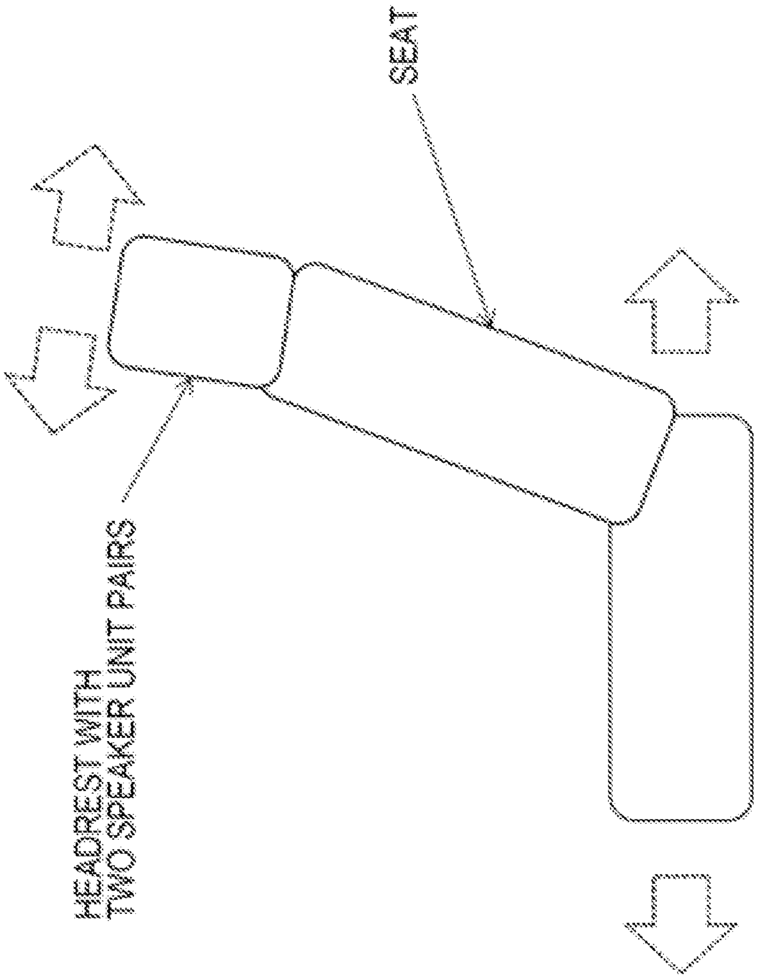
FIG. 19 is a diagram illustrating an example of an acoustic system installed in a seat of an automobile.
Figure 20:
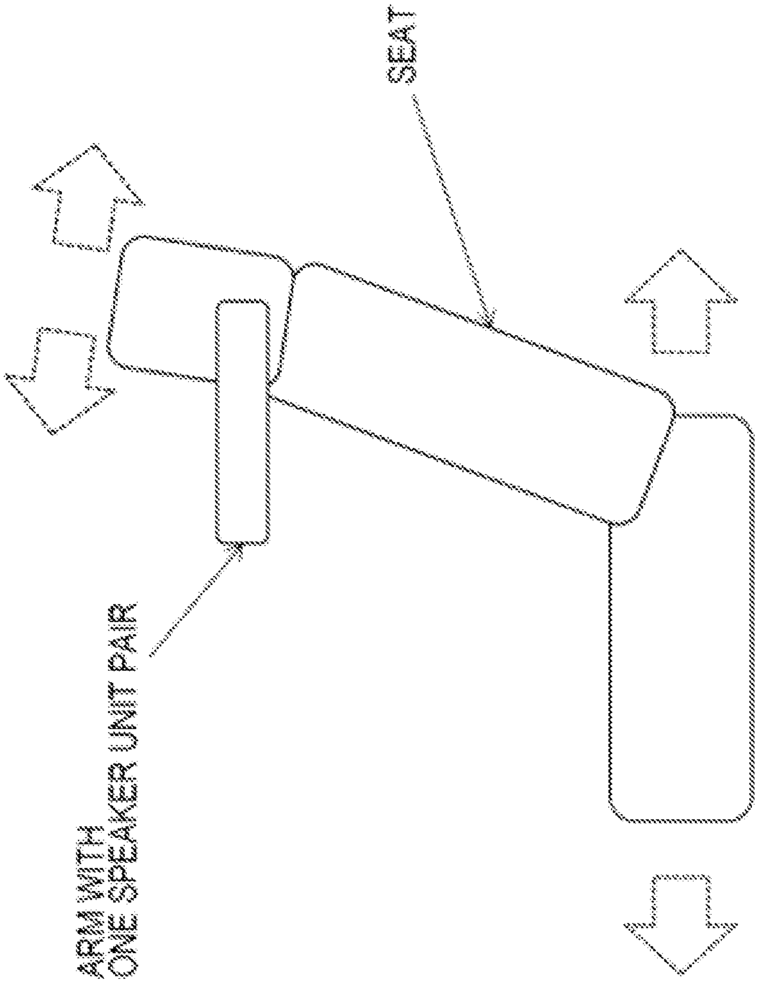
FIG. 20 is a diagram illustrating an example of an acoustic system installed in a seat of an automobile.

Each of FIGS. 19 and 20 is a diagram illustrating an example of an acoustic system installed in a seat of an automobile. In the example of FIG. 19, a speaker unit pair is installed in a headrest of a seat of an automobile. Specifically, N=2, and the first speaker unit pair and the second speaker unit pair are installed in the headrest of the seat of the automobile. On the other hand, in the example of FIG. 20, the speaker unit pair is installed on an arm to which the seat of the automobile is attached. Specifically, N=2, and the speaker unit pair is installed on two arms attached to the seat of the automobile so as to sandwich a head of a user who uses the seat. Note that the arm may be movable.

Other Examples

An example other than a seat of an automobile, specifically, a seat for a game table such as a pachinko or a slot will be described. Normally, a user plays on a game on a game table using a seat in front of the game table. Therefore, as for the seat for the game table, the arm as described in the example of the automobile may be installed, and the speaker unit pair may come near the position where the ear of the user seated in the seat comes. Note that, since the seat for the game table may not have a backrest, the arm may be installed on the game table instead of installing the arm on the seat. Furthermore, the arm may be movable, and the user himself/herself may adjust the arm such that the speaker unit pair comes near the ear.

According to the embodiment of the present invention, it is possible to reproduce a sound that can be heard only in a very limited narrow range such as the vicinity of the speaker system.

<Supplement>

The above-described description of the embodiments of the present invention has been presented for purposes of illustration and description. There is no intention to be exhaustive or to limit the invention to the precise form disclosed. Modifications and variations are possible from the above teaching. The embodiments have been chosen and represented in order to provide the best illustration of the principles of the present invention and to enable those skilled in the art to utilize the present invention in various embodiments and by adding various modifications to be suited for contemplated practical use. All such modifications and variations are within the scope of the present invention as defined by the appended claims, interpreted in accordance with a fairly and legally equitable breadth.

The invention claimed is:

1. An acoustic system comprising:

a directivity control device including at least one directivity control unit that generates a first processed acoustic signal from a first acoustic signal of a predetermined sound source and generates a second processed acoustic signal from a second acoustic signal having an opposite phase to the first acoustic signal by executing predetermined signal processing; and a speaker system including at least one speaker unit pair including a positive speaker unit that emits a sound based on the first processed acoustic signal and a negative speaker unit that emits a sound based on the second processed acoustic signal, wherein the signal processing executed by the directivity control unit is processing of causing a sound emitted from the positive speaker unit of the speaker unit pair and a sound emitted from the negative speaker unit of the speaker unit pair to be audible in an area to be made audible near the speaker unit pair and to be inaudible in an area to be made inaudible, the positive speaker unit and the negative speaker unit of the speaker unit pair are arranged such that a sound emitted from the positive speaker unit in a direction opposite to a user direction in which the speaker unit pair faces a user and a sound emitted from the negative speaker unit in a direction opposite to the user direction are transmitted in the user direction by wraparound, the speaker unit pair is configured as the positive speaker unit and the negative speaker unit side by side, and the positive speaker unit emits the sound based on the first processed acoustic signal toward the user direction and the negative speaker unit emits the sound based on the second processed acoustic signal toward the user direction, and the area to be made audible is an area where phases of sounds emitted from the speaker unit pair in the user direction and sounds emitted from the speaker unit pair in the direction opposite to the user direction and going around in the user direction do not match.

2. The acoustic system according to claim 1, wherein the directivity control device generates the first processed acoustic signal and the second processed acoustic signal such that the area to be made audible includes an intermediate area between respective two speaker units of the speaker unit pair.

3. The acoustic system according to claim 2, wherein the area to be made audible includes a point that is equidistant from the positive speaker unit of the speaker unit pair and the negative speaker unit of the speaker unit pair such that a sound emitted from the positive speaker unit of the speaker unit pair and a sound emitted from the negative speaker unit of the speaker unit pair cancel each other.

4. An acoustic system comprising:

a reproduction device including an n-th reproduction unit (n=1, . . . , N) that outputs a (2n−1)-th acoustic signal that is an acoustic signal of a predetermined sound source and a 2n-th acoustic signal that is an acoustic signal having an opposite phase to the (2n−1)-th acoustic signal;

a directivity control device including an n-th directivity control unit (n=1, . . . , N) that generates a (2n−1)-th processed acoustic signal from the (2n−1)-th acoustic signal and generates a 2n-th processed acoustic signal from the 2n-th acoustic signal by executing predetermined signal processing; and a speaker system including an n-th speaker unit pair (n=1, . . . , N) including a positive speaker unit that emits a sound based on the (2n−1)-th processed acoustic signal and a negative speaker unit that emits a sound based on the 2n-th processed acoustic signal, N being an integer of 1 or more, wherein the signal processing executed by the n-th directivity control unit (n=1, . . . , N) is processing of causing a sound emitted from the positive speaker unit of the n-th speaker unit pair and a sound emitted from the negative speaker unit of the n-th speaker unit pair to be audible in an area to be made audible near the n-th speaker unit pair and to be inaudible in an area to be made inaudible, the positive speaker unit and the negative speaker unit of the n-th speaker unit pair are arranged such that a sound emitted from the positive speaker unit in a direction opposite to an n-th user direction in which the n-th speaker unit pair faces a user and a sound emitted from the negative speaker unit in a direction opposite to the n-th user direction are transmitted in the n-th user direction by wraparound, the n-th speaker unit pair is configured as the positive speaker unit and the negative speaker unit side by side, and the positive speaker unit of the n-th speaker unit emits the sound based on the (2n−1)-th processed acoustic signal toward the n-th user direction and the negative speaker unit emits the sound based on the 2n-th processed acoustic signal toward the n-th user direction, and the area to be made audible is an area where phases of sounds emitted from the n-th speaker unit pair in the n-th user direction and sounds emitted from the n-th speaker unit pair in the direction opposite to the n-th user direction and going around in the n-th user direction do not match.

5. The acoustic system according to claim 4, wherein the directivity control device generates the (2n−1)-th processed acoustic signal and the 2n-th processed acoustic signal such that the area to be made audible includes an intermediate area between respective two speaker units of the n-th speaker unit pair.

6. The acoustic system according to claim 5, wherein the area to be made audible includes a point that is equidistant from the positive speaker unit of the n-th speaker unit pair and the negative speaker unit of the n-th speaker unit pair such that a sound emitted from the positive speaker unit of the n-th speaker unit pair and a sound emitted from the negative speaker unit of the n-th speaker unit pair cancel each other.

7. The acoustic system according to claim 5, wherein N=2, and a first speaker unit pair and a second speaker unit pair are installed in a headrest of a seat of an automobile.

8. The acoustic system according to claim 5, wherein N=2, and a first speaker unit pair and a second speaker unit pair are respectively installed on two arms attached to a seat of an automobile so as to sandwich a head of a user who uses the seat.

* * * * *